Kilmer L. Hall
Chester C. Carroll,
*INVENTORS.*
BY Harry M. Saragovitz
Edward J. Kelly
Herbert Berl
Robert C. Sims

AUTOMATIC DIGITAL PULSE ANALYZER

Filed Nov. 3, 1967 4 Sheets-Sheet 2

Kilmer L. Hall
Chester C. Carroll,
INVENTORS.
BY Harry M. Saragovitz
Edward J. Kelly
Herbert Berl
Robert C. Sims

AUTOMATIC DIGITAL PULSE ANALYZER

Filed Nov. 3, 1967 4 Sheets-Sheet 3

Kilmer L. Hall
Chester C. Carroll,
INVENTORS.

BY Harry M. Saragovitz
Edward J. Kelly
Herbert Berl
Robert C. Sims

AUTOMATIC DIGITAL PULSE ANALYZER

Filed Nov. 3, 1967 4 Sheets-Sheet 4

Kilmer L. Hall
Chester C. Carroll,
INVENTORS.
BY Harry M. Saragovitz
Edward J. Kelly
Herbert Berl
Robert C. Sims United States Patent Office 3,543,156
Patented Nov. 24, 1970

3,543,156

AUTOMATIC DIGITAL PULSE ANALYZER

Kilmer L. Hall, Huntsville, and Chester C. Carroll, Auburn, Ala., assignors to the United States of America as represented by the Secretary of the Army Filed Nov. 3, 1967, Ser. No. 681,065
Int. Cl. G01r *17/02;* G04f *9/00*
U.S. Cl. 324—181 1 Claim

ABSTRACT OF THE DISCLOSURE

Three embodiments are shown of the invention. One embodiment works from the assumption that the maximum amplitude of an input pulse is known, and uses comparators to determine when the signal is above or below certain percentages of the value. The comparators feed a logic circuit controlled by a clock. The logic circuit provides outputs to counters for the rise time, decay time, and duration of the pulse. Another embodiment omits the clock, and uses integrators in place of the counters. The third embodiment makes no assumption as to pulse amplitude, but determines the maximum pulse amplitude, and uses this amplitude to determine rise time, etc., of the pulse.

DEDICATORY CLAUSE

The invention described herein may be manufactured, used, and licensed by or for the Government for governmental purposes without the payment to us of any royalty thereon.

BACKGROUND OF THE INVENTION

The field of the present invention is directed towards the automatic measurement of the characteristics of pulses. A conventional method for measuring these characteristics is done by displaying the pulse to be measured on an oscilloscope and visually reading the pulse parameters thereon. However, this method of measurement requires that the pulse either be repetitive or that the oscilloscope trace be photographed or stored.

SUMMARY OF THE INVENTION

Three embodiments of an invention for automatic digital pulse analyzation are set forth. The first is an all digital system in which the maximum magnitude of the pulse to be analyzed is known. First and second comparators are provided to have outputs which are in a digital "1" state when the amplitude of the pulse is above 10% of its maximum amplitude and when the amplitude of the pulse is above 90% of its maximum amplitude respectively. The outputs of the comparators are fed to control logic circuit for processing. Also, the output of the second comaparator is further fed to a flip-flop memory element whose output is connected to an input of the control logic circuit.

From this information the logic can provide an output signal to a rise-time counter which will have an output in accordance with the rise-time of the pulse, an output signal to a decay time counter which will have an output in accordance with the decay time of the pulse, and an output signal to a pulse duration counter which will have an output in accordance with the duration of the pulse. Clock and reset control elements are provided for counting and resetting purposes.

The second system is a hybrid system in which the inputs to the control logic circuit are the same as above, but instead of counters connected to the output of the control logic, integrators are used. With the use of the integrators the clock is no longer needed. The output of the integrators can be read directly to obtain a readout of the rise-time, width, and decay time of the pulse, or it can be converted to digital terms by means of multiplexers and A/D converter and then read out.

The third system is a digital system for measuring the characteristics of a pulse without knowing in advance what the maximum pulse height will be. This system makes use of the first comparator but substitutes a data processor comparator for the second comparator and flip-flop memory element of the other two systems. The data processor determines the pulse height and feeds this information to the control logic circuit. The data processor also supplies this information to a height readout element.

BRIEF DESCRIPTION OF THE DRAWING

The various features of novelty which characterize this invention are pointed out with particularity in the claims annexed to and forming a part of this specification. For a better understanding of the invention, however, its advantages and specific objects obtained with its use, reference should be had to the accompanying drawing and descriptive matter in which is illustrated and described preferred embodiments of the invention, and in which:

DESCRIPTION OF THE PREFERRED EMBODIMENTS

Figure 1:
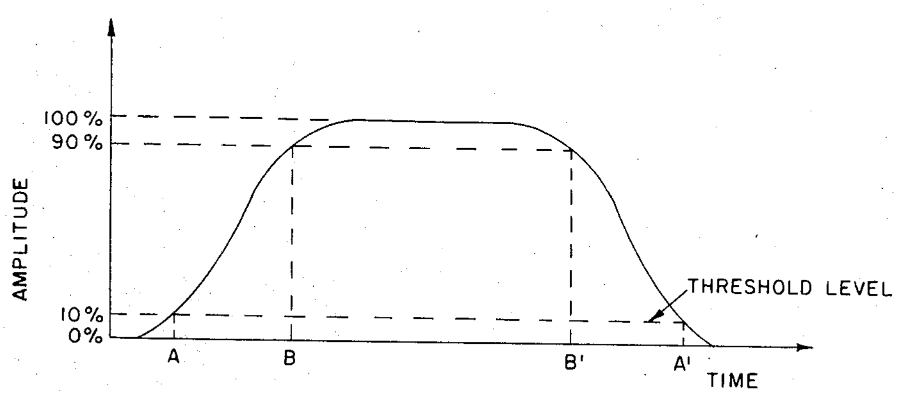
FIG. 1 is an illustration of a pulse waveform which can be analyzed by the invention.

For the systems of the present invention, a pulse is defined as a variation of an electrical quantity, such as voltage or current from a value that is constant (not necessarily zero) for some time before the pulse and has the same constant value for some time afterwards. The pulse has a finite rise time, decay time, and pulse duration. Such a pulse is illustrated in FIG. 1.

Figure 2:
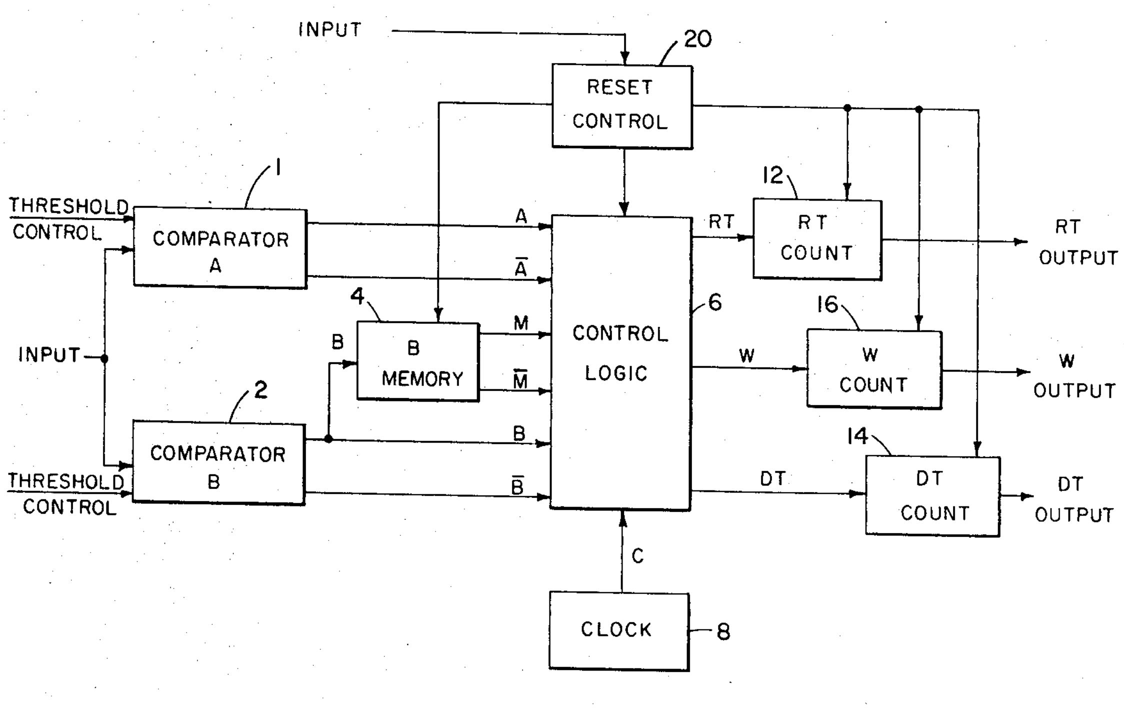
FIG. 2 illustrates an all digital pulse analyzer in block diagram in accordance with one embodiment of the present invention.

The pulse analyzer shown in FIG. 2 is constructed to measure rise time, decay time, and pulse duration. The peak pulse amplitude must be defined since it is required in this analyzer before the other pulse characteristics can be measured. It is assumed that the zero axis for the pulse is the normally constant value. The excursion of the pulse magnitude away from the zero axis is assumed to be in the positive direction with respect to the zero axis.

The peak pulse amplitude is defined as the maximum absolute peak value of the pulse. In many cases such portions as spikes, overshoots, and polarity reversals may be eliminated. For the application under consideration here, it is assumed that the nonpertinent portions of the pulse are removed before the value for the peak pulse amplitude is obtained.

The rise time is defined as the interval between the instants at which the instantaneous amplitude first reaches ten percent and ninety percent of the peak pulse amplitude. This is illustrated in FIG. 1 as the time from A to B.

Pulse duration is defined as the time interval between the first and last instants at which the instantaneous amplitude reaches ten percent of the peak pulse amplitude. The pulse duration is shown in FIG. 1 as the time from A to A′.

Decay time is defined as the interval between the instants at which the instantaneous amplitude last reaches ninety percent and ten percent of the peak pulse amplitude. This is shown in FIG. 1 as the time from B′ to A′.

During the rise time, it is assumed that the instantaneous amplitude does not drop below the level of ten percent of the peak pulse amplitude. Also, it is assumed that the instantaneous amplitude does not rise above the level of ninety percent of the peak pulse amplitude during the decay time. Further the instantaneous amplitude does not drop below the ninety percent level until the actual beginning of the decay time. In this invention disclosure, rise time is denoted by RT, decay time by DT, and pulse duration by W.

The pulse instantaneous amplitude is normally represented as a voltage; therefore, the voltage is an analog of the instantaneous amplitude. Since the instant invention uses a digital approach, it is necessary to convert the pulse parameter information from analog to digital form. A comparator circuit is used for the conversion.

A comparator circuit is well known in the art as a circuit used to mark the instant when an arbitrary waveform attains some reference level. It could take the shape of back biased diodes (biased at the reference level) connected between the pulse and a bistable multivibrator. As shown in FIG. 2, two comparators A and B are used in this embodiment of the invention. Comparator A is set to mark the instant when the pulse level passes through ten percent of the peak pulse amplitude. Comparator B marks the instant when the instantaneous pulse amplitude passes through the ninety percent level. The comparator circuits 1 and 2 mark the levels by changing their output signals from a binary zero to a binary one as the input waveform goes above the reference level and then back to a binary zero as the waveform drops below the reference level. The output of each of the comparators is available in both complemented and uncomplemented form. The uncomplemented outputs of comparator A and comparator B are denoted as A and B respectively in FIG. 2. The complemented outputs of the comparators are denoted by $\overline{A}$ and $\overline{B}$.

Figures 3A, 3B, 3C, 3D, 3E, 3F:
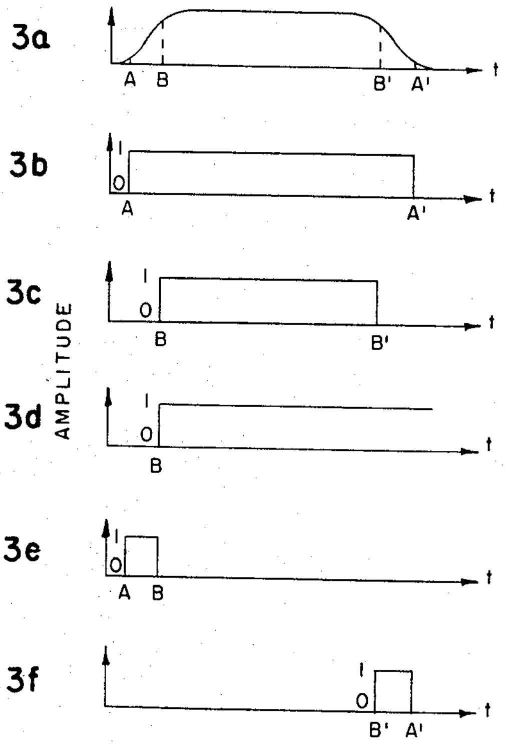
FIGS. 3*a*–3*f* illustrate wave forms of signals applied to and derived from the circuit of FIG. 2.

The output waveforms for comparators A and B, referenced to input pulse in FIG. 3*a*, are shown in FIGS. 3*b* and 3*c*. From the waveforms it may be seen that if the rise time is measured during the time the output of comparator A is one and the output of comparator B is zero, that rise time would also be measured during the decay time and likewise decay time would be measured during rise time. To eliminate this problem a memory 4 is included for the B signal. The uncomplemented output of the memory element is defined as M, shown in FIGS. 2 and 3*d*.

Figure 4:
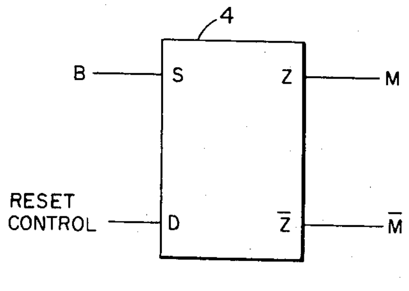
FIG. 4 is a representation in greater detail of the B memory flip-flop shown in FIG. 2.

The B memory 4 is a flip-flop memory element and is shown in FIG. 4. It is assumed that a digital one from the B comparator and the reset control will not be applied to the flip-flop simultaneously. Before a pulse is entered into the analyzer, it is assumed that the flip-flop is reset by entering a digital one at the D input. When reset, the M output is a digital zero and the $\overline{M}$ (complement of M) is a digital one. Then the only input which produces a digital one at the M output is a digital one at the S input.

The digital waveforms of the outputs of comparator A, comparator B, and the B memory are utilized in the control logic 6, shown in FIG. 2, to produce output signals to the counter circuits. A conventional clock unit 8 is provided for a counting reference. The input-output relationships for the control logic were derived from the information in Table 1 below. The information in Table 1 was obtained by observing that the rise time counter 12 should count the clock pulses (C) from clock 8 which occur during the time when comparator A is on (digital one output), comparator B is off (digital zero output), and M is off (digital zero output). This corresponds to counting the clock pulses which occur during the time interval A to B shown in FIG. 3*e*. It was also observed that the decay time counter 14 should count the clock pulses during the time when comparator A is on, comparator B is off, and M is on. This is the interval represented by the distance from B′ to A′ in FIG. 3*f*. It was noted that the pulse duration counter 16 should count the clock pulses which occur during the entire time when comparator A is on. This is the time represented by A to A′ in FIG. 3*b*.

The logic function representation for the control logic output to the rise time (RT) counter 12 is given as:

$$RT(A,B,M,C)=A\overline{B}\overline{M}C$$

The decay time (DT) counter 14 is given by:

$$DT(A,B,M,C)=A\overline{B}MC$$

The pulse duration (W) counter 16 input is represented by:

$$W(A,B,M,C)=AC$$

TABLE I.—ALL DIGITAL CONTROL LOGIC TRUTH TABLE

| Inputs | | | Outputs | | |
|---|---|---|---|---|---|
| A | B | M | RT | DT | W |
| 0 | 0 | 0 | 0 | 0 | 0 |
| 0 | 0 | 1 | 0 | 0 | 0 |
| 0 | 1 | 0 | 0 | 0 | 0 |
| 0 | 1 | 1 | 0 | 0 | 0 |
| 1 | 0 | 0 | 1 | 0 | 1 |
| 1 | 0 | 1 | 0 | 1 | 1 |
| 1 | 1 | 0 | 0 | 0 | 1 |
| 1 | 1 | 1 | 0 | 0 | 1 |

To allow the measurement of the characteristics of a repetitive pulse, a circuit may be added to the control logic to prevent any pulse after the first one from destroying the previous measurements. A circuit to lock the control logic after the first pulse would then be included in the control logic.

The counters for each of the pulse parameters accumulate clock pulses from control logic 6. The counter sequence runs from zero to nine then the counter returns to zero and repeats the sequence as long as the clock pulses are gated to the counter input. The rise time counter 12, decay time counter 14, and pulse duration counter 16 are identical. A ripple-through type counter may be used. A counter of this type produces each of the four bits of a four bit binary coded decimal at slightly different times. The displacement in time of the bits is due to the delays introduced by flip-flops in the counter. Each of these counters counts the pulses from clock reference 8 and displays the total pulse count in binary coded decimal form at the counter output. Further readout devices could be added to visually show the counting on the characteristics of the pulse.

The pulse duration will always be equal to or greater than the sum of the rise time and the decay time. In many practical applications the pulse duration will be much longer than this sum. For these cases, it may become necessary to insert a frequency divider between control logic 6 and W counter 16 shown in FIG. 2. The magnitude of the division necessary will depend upon the particular application. It may also be necessary to make the clock frequency variable. Otherwise, all the digits of the counter for some or all of the parameters may fill before the measurement is completed. A variable clock 17, as shown in FIG. 5, could be obtained by using a variable frequency, free-running multivibrator.

The reset control circuit 20 performs the function of resetting each of the memory's uncomplemented outputs to a digital zero. As shown in FIGS. 2 and 5, the B memory and each of the counters require resetting before another pulse is analyzed. The reset circuit is controlled externally, either manually or automatically by connections to the input pulse.

Figure 5:
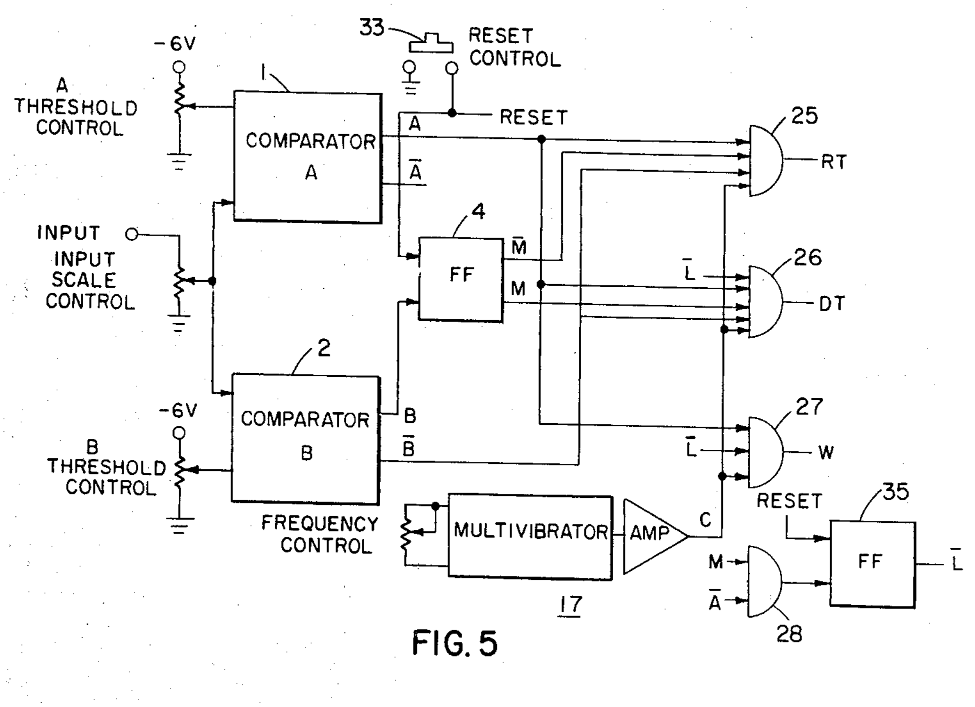
FIG. 5 shows a schematic diagram illustrating the wiring diagram of the comparator and control logic circuit of FIG. 2.

A detailed diagram for the comparator and control logic circuits is shown in FIG. 5. Gates 25–27 are AND gates. The operation of the device will take place only after the reset control button 33 is pushed. Button 33 may also be connected to cause the counters and readout devices to go to zero. Threshold control A is set at 10% of the predetermined pulse height, and threshold control B is set at 90% of the maximum pulse height. When the pulse height (usually determined according to voltage) reaches the 10% level, comparator 1 changes states and its A output becomes a digital one ("1"). This is fed to gate 25, along with the "1's" from outputs $\bar{B}$ and $\bar{M}$, to cause gate 25 to have a "1" output when the clock pulse C is a "1." As long as A, $\bar{B}$, and $\bar{M}$ stay "1's," gate 25 will gate the clock pulses C to the RT output. However, when the level of the pulse rises to 90% of its height, comparator 2 changes states and $\bar{B}$ becomes a "0" while B becomes a "1." This causes the output from gate 25 to have a continuous "0" output; therefore preventing any further RT outputs.

The "1" on the A output of the comparator 1 is also fed to gate 27. An output $\bar{L}$ from lockout means 35 is fed to the AND gate 27 also. Lockout means 35 will have a "1" on its $\bar{L}$ output until both M and $\bar{A}$ are "1's" at the same time due to the connection of the AND gate 28 to its signal input. Flip-flop 35 may be of the same construction as flip-flop 4. As long as output A stays a "1," gate 27 will pass the clocks pulses to the W output.

While the pulse level is above 90%, output B remains "1" and $\bar{B}$ remains a "0." Flip-flop 4 goes into its set state when B first becomes a "1" and will stay there until the reset button 33 is activated. Until the pulse level drops below the 90% level only the output W is being fed the clock pulses. When the pulse level does drop below 90%, comparator 2 changes states again and $\bar{B}$ again becomes a "1"; however, since $\bar{M}$ is now a "0," gate 25 will not pass the clock pulses. Gate 26 will now have a "1" output when the clock pulse C is a "1" as all its inputs are "1's." This will allow gate 26 to gate the clock pulses to the DT output.

When the pulse level drops below the 10% value, comparator 1 will change states and output A will become a "0" thus changing the outputs of gates 26 and 27 and stopping the flow of clock pulses to the DT and W outputs. Also the inputs (M and $\bar{A}$) to gate 28 are now both "1." This will cause the lockout flip-flop 35 to go to its set state; therefore, causing output $\bar{L}$ to become a "0." This will cause a "0" input to be on gates 26 and 27; therefore, preventing any further feeding of clock pulses to the DT and W outputs until flip-flop 35 is reset. By the use of flip-flop 35, and further input pulses fed to the system will not be counted by the DT and W counters until the reset button 33 is pushed. The zero input to gate 25 from flip-flop 4 will likewise prevent any further clock pulses from being fed to the RT output until the flip-flop is reset.

The pulse parameters to be measured using the hybrid system are rise time, decay time, and pulse duration. Since these same parameters were measured using the all digital approach the same parameter definitions are assumed. The peak pulse amplitude must again be given before the other characteristics may be measured. The same symbolism is followed when possible.

Figure 6:
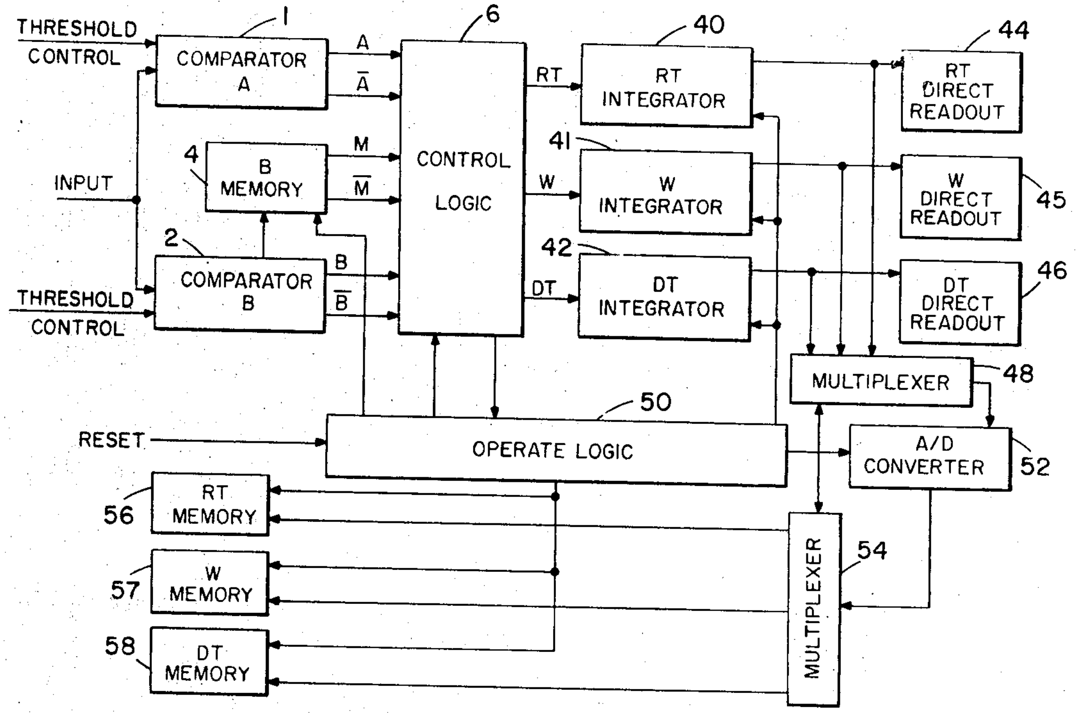
FIG. 6 is a representation in block form of a hybrid pulse analyzer in accordance with another embodiment of the invention.

If FIG. 2 from the all digital system is compared to the hybrid system block diagram shown in FIG. 6, it can be noted that the same ideas are used for part of the scheme. Comparators A and B along with the B memory and control logic are the same except that no clock signal is required. The equations for the signals from the control logic to the integrators are given by:

$$RT(A,B,M)=A\bar{B}\bar{M}$$
$$DT(A,B,M)=A\bar{B}M$$
$$W(A,B,M)=A$$

FIG. 7 shows the signal waveforms. FIG. 7*a* is a general pulse waveform with the points indicated where comparator A and comparator B change states. FIG. 7*b* shows the output of comparator A which is the same as signal W in this case. FIGS. 7*c* and 7*d* show the RT and DT signals respectively. The output of comparator B is not shown here since it is the same as shown in FIG. 3*c* in the last section. The RT, DT, and W signals are connected to the input of operational integrators 40–42 as shown in FIG. 6. Integrators 40–42 are of a conventional design such as a capacitor-feedback amplifier.

Figure 7A:
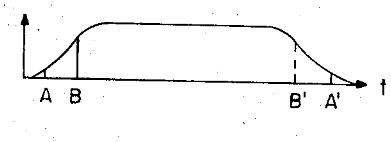
FIGS. 7*a*–7*g* illustrate wave forms of signals applied to and derived from the circuit of FIG. 6.
Figure 7B:
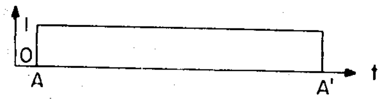
Figure 7C:
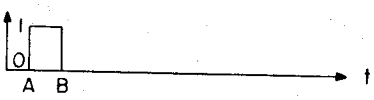
Figure 7D:
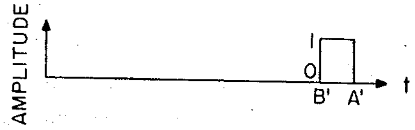
Figure 7E:
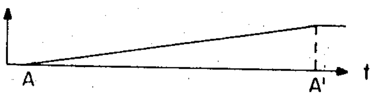
Figure 7F:
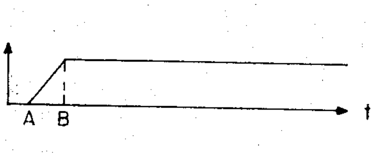
Figure 7G:
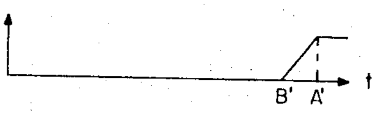

The input to each of the integrators for the duration of the pulse parameter being measured is a constant positive voltage (digital one). Therefore, the output of each of the integrators will be a linear function of time during the parameter duration. As shown in FIGS. 7*e*, 7*f*, and 7*g* the output voltage increases at a constant rate as long as the constant input voltage is applied. When the input is removed (digital zero) the integrator holds the output, allowing the integrator to serve as an analog memory, thus permitting the output to be read at any time after the input has returned to a digital zero. For a digital zero, the integrator input must be a zero voltage to prevent error due to output drift. In FIGS. 7*e*, 7*f*, and 7*g* the integrator output proceeds in a positive direction when a positive input is applied. This is done for simplicity only; there is normally an inversion of polarity through an operational amplifier.

The output of the integrators in FIG. 6 is proportional to the parameter measured. If the output is multiplied by a proportionality constant and displayed in analog form, the value for each pulse characteristic may be read directly as indicated by the direct readout blocks 44–46.

If the pulse parameter information is desired in digital form, some analog-to-digital conversion scheme is necessary. One conversion scheme is shown in FIG. 6. By using the multiplexer circuits, one analog-to-digital converter is used to convert the three integrator outputs to digital form.

As shown in FIG. 6, the integrator output signals are connected to the first multiplexer 48. By using this circuit, one analog-to-digital converter is used to convert the three integrator outputs. The operate logic 50 generates a signal which causes the multiplexer to scan the three integrator outputs. Each integrator output is connected to the analog-to-digital converter 52 long enough to complete the conversion of the output; the next integrator output is then connected. The output of the analog-to-digital converter is connected to a secod multiplexer 54. This multiplexer operates in synchronism with the first multiplexer. While the output of RT integrator 40 is being converted to digital form the digital information from the analog-to-digital converter is fed into the RT memory 56. The information in the memory may either accumulate and be read in parallel or the information may be read as it becomes available. The same operation applies for the W memory 57 and DT memory 58.

Instead of the reset control used in the digital design approach, operate logic 50 is used for this scheme. The operate logic produces a signal which causes each of the memory elements to be reset. It also produces signals which cause the multiplexer circuits and the analog-to-digital converter to be synchronized. The operate logic can be triggered by the signals in the control logic or by some external signal.

Most of the complexity of this scheme is produced by the circuits necessary to convert the analog information to digital form. If the pulse characteristic information can be used in analog form the design is simplified considerably by this method.

Since the integrator circuits store the parameter information, the analog-to-digital conversion may be made at a very slow rate without effect on the accuracy of the readout. If fast digital readout is not necessary, the accuracy and range consideration may be limited to the comparator, control logic, and integrator circuits.

Figure 8:
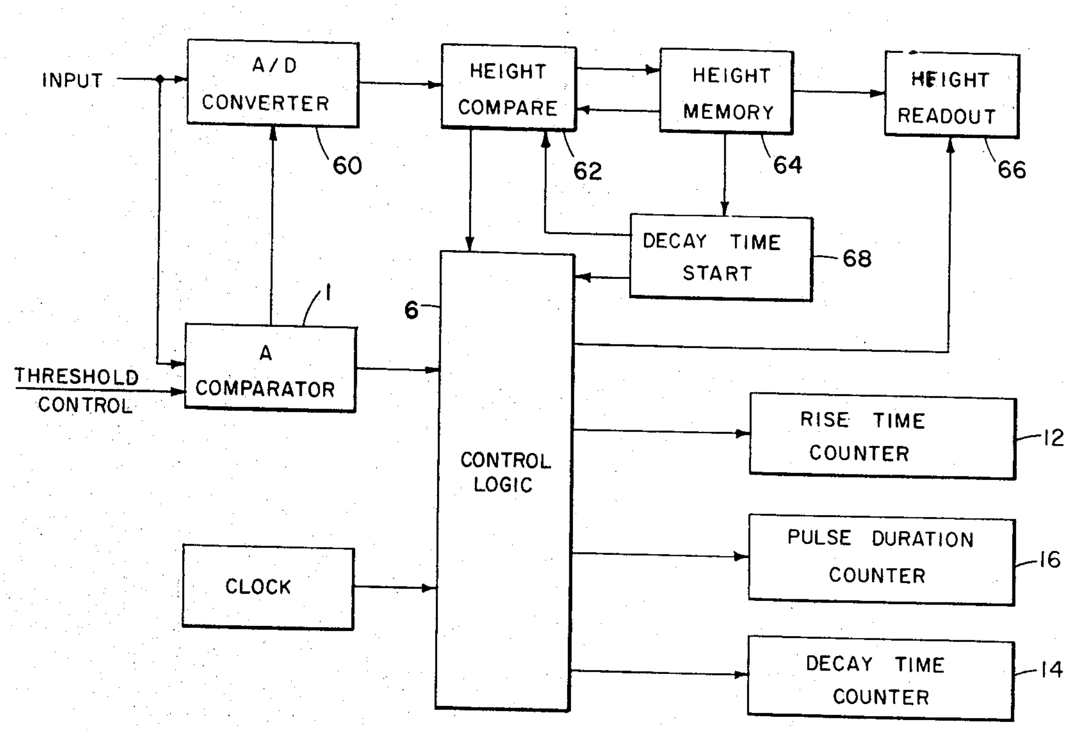
FIG. 8 is a block diagram of a pulse analyzer in accordance with yet another embodiment of the invention.

For some applications it may be desirable to measure the pulse height as well as the other pulse characteristics. The system shown in FIG. 8 shows one approach which may be used in a pulse analyzer to measure peak pulse amplitude, rise time, decay time, and pulse duration.

The definition for peak pulse amplitude and zero axis is the same as for the previous discussion. The excursion of the pulse magnitude away from the zero axis is again assumed to be only in the positive direction.

Figure 9:
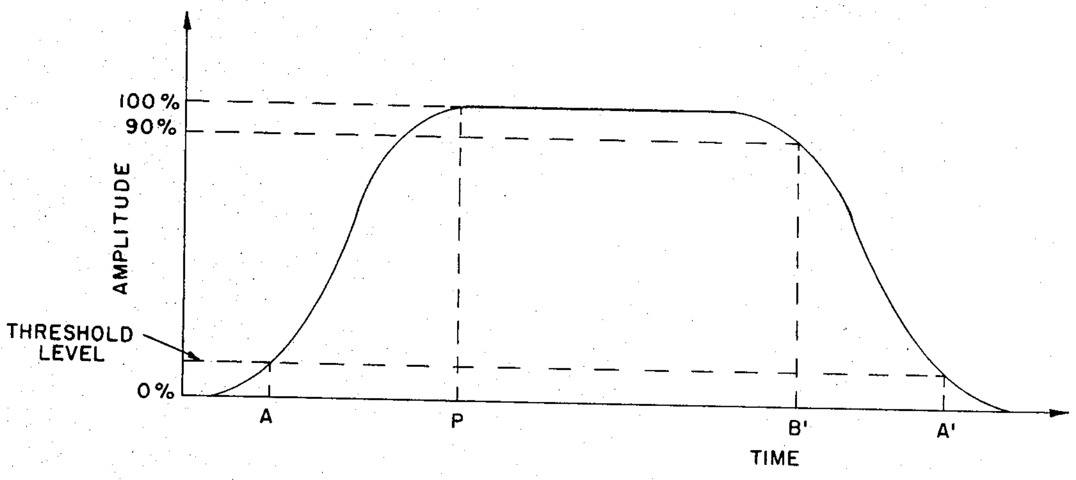
FIG. 9 is a further illustration of the pulse waveform which can be used in this invention.

The rise time is defined as the time elapsed between the point where the instantaneous amplitude exceeds a threshold value to the point where the peak pulse amplitude is first reached. In FIG. 9, the threshold value is shown as A and the point where the peak pulse amplitude is first reached is shown as point P. The rise time (RT) is the time from A to P.

The decay time is defined as the time elapsed from the point B′ where the instantaneous amplitude last drops below ninety percent of the peak pulse amplitude to the point A′ where the amplitude last drops below the threshold level. The time from B′ to A′ in FIG. 9 is the decay time (DT).

The time elapsed between the point where the amplitude first reaches the threshold level and the point where the amplitude last drops below the threshold level is defined as the pulse duration. The pulse duration (W) is the time from A to A′ in FIG. 9.

During the rise time it is assumed that the instantaneous amplitude does not drop below the threshold level. Similarly, during the decay time it is assumed that the amplitude does not rise above the ninety percent level. After the rise time is completed, it is assumed that the amplitude stays above the ninety percent level until the start of the decay time. It is assumed that spikes, overshoots and noise are small enough to introduce no more than the allowable error into the pulse height.

The block diagram for a scheme to measure the pulse height, rise time, decay time, and pulse duration is shown in FIG. 8. The pulse to be analyzed is entered as an input to the analog-to-digital converter 60 and the A comparator 1. When the instantaneous amplitude of the pulse reaches a threshold value set on comparator A, the analog-to-digital converter is placed in operation; a signal is sent to control logic 6 to indicate the start of the rise time and pulse duration. The analog-to-digital converter samples the pulse amplitude periodically and produces digitally encoded values for the pulse amplitude for each sampling time. The digital value of the amplitude is sent to height compare circuit 62 and compared to the value stored in the height memory 64. If the stored value is less than the present value, the stored value is shifted out of the height memory and the present value shifted into the memory until the next value of the amplitude arrives in the height compare circuit. This process continues until the value stored in the memory is larger than the present value. At this time the value of the pulse height stored in the height memory is shifted into the height readout 66 and into the decay time start circuit 68. In addition, a signal from height compare 62 denoting the end of the rise time is entered into the control logic. The value of the pulse height in height readout 66 is locked so that future digital values shifted out of the height memory will not destroy the pulse height measurement. The value of the pulse height shifted into the decay time start circuit is used to calculate ninety percent of this value. The ninety percent value for pulse height is stored inside decay time start 68 and compared to each pulse amplitude value which occurs after the peak pulse amplitude is reached. This comparison occurs in height compare circuit 62. The control logic prevents the output of the decay time start circuit from being compared to the present pulse amplitude in the height compare circuit until the peak pulse amplitude is reached.

When the height compare circuit indicates that the pulse amplitude has reached ninety percent of the peak pulse amplitude, a signal is sent to the control logic to indicate the start of the decay time. When the pulse amplitude drops below the threshold value, a signal denoting the end of the decay time and pulse duration is entered into the control logic. The operation of the control logic and the remainder of the pulse analyzer from this point is similar to the scheme used for the digital approach if the following substitutions are made: the signal denoting the threshold level of the pulse is substituted for the output of comparator A; the signals from height comparer 62 indicating the point where the peak pulse amplitude is first reached and the output of decay time start 68 are used to produce the logic signals corresponding to the output of comparator B and the output of B memory.

The control logic gates clock pulses to the proper counter based on information furnished by the A comparator and the height compare circuit. The rise time counter 12 counts the clock pulses which occur between the time comparator A indicates that the preset threshold has been exceeded and the time the height compare indicates that the peak pulse amplitude has been reached. The pulse duration counter 16 counts the clock pulses which occur while the pulse amplitude is above the threshold set on comparator A. The decay time counter 14 starts counting when the height compare circuit indicates that the pulse amplitude has dropped to ninety percent of the peak pulse amplitude, and stops counting when the amplitude drops below the threshold set on comparator A. The digitally encoded measurements of pulse height, rise time, pulse duration, and decay time are then available from the height readout, rise time counter, pulse duration counter, and decay time counter respectively.

A disadvantage of this method is that the pulse amplitude must constantly increase during the rise time. This problem may be compensated for by setting a dead zone in the height compare circuit. This would allow the amplitude to drop to a value corresponding to the bottom value of the sum of the pulse amplitude minus the dead zone before an incorrect indication would be produced by the height compare circuit. The dead zone must be removed after the peak pulse amplitude is reached or an error will be introduced into the decay time measurement.

This system is limited in range by the sampling analog-to-digital converter. A set of hardware which is specified to have a frequency from DC to one megahertz typically includes sampling analog-to-digital converter elements which sample at 300 kilohertz.

While the invention has been described with reference to preferred embodiments thereof, it will be apparent that various modifications and other embodiments thereof will occur to those skilled in the art within the scope of the invention.

We claim:

1. A pulse analyzer comprising first and second comparator means, said comparator means each having an input adapted to receive a pulse which is to be analyzed, said first and second comparator means having outputs which indicate when the pulse is at least at first and second values respectively, memory means having an input connected to an output of said second comparator means, said memory means having outputs which indicate whether the second comparator means has ever indicated that the pulse has reached said second value, and control logic means having a plurality of inputs connected to the outputs of said comparator means and said memory means and a plurality of output signals each proportional to a characteristic of said pulse, wherein said comparator means and said memory means each have first and second binary complemented outputs which have a first and second state, and the first outputs of said first and second comparator means have a binary "1" output (first state) when the pulse value is at least at said first and second values respectively and a binary "0" output (second state) when the pulse value is below said first and second values respectively, said memory means has an input connected to the first output of said second comparator means, and said first output of said memory means having a binary "0" (first state) until a binary "1" is fed to its input by the second comparator means and thereafter the first output of the memory means will have a binary "1" output (second state), a first output of said control logic means has a signal output only when both the first comparator means and the memory means are in their first states, a second output of said control logic means has a signal output only as long as said first comparator means is in its first state, and a third output of the logic means has a signal output only when the first comparator means is in its first state and the second comparator means and the memory means are in their second states; said signal outputs of the control logic means are binary "1's", and further comprising first through third integrator means connected to these outputs, wherein said integrator means have outputs which are proportional to characteristics of said pulse, and further comprising first and second multiplexers and an analog-to-digital converter, the outputs of the integrator means being connected to the converter by way of the first multiplexer, and memory units being connected to said converter by way of the second multiplexer.

References Cited

UNITED STATES PATENTS

| | | | |
|---|---|---|---|
| 3,359,491 | 12/1967 | McCutcheon | 324—68 |
| 3,423,677 | 1/1969 | Alford et al. | 324—158 X |

FOREIGN PATENTS

| | | |
|---|---|---|
| 989,740 | 4/1965 | Great Britain. |

ALFRED E. SMITH, Primary Examiner

U.S. Cl. X.R.

324—98